(12) United States Patent
Faruque et al.

(10) Patent No.: US 9,039,035 B1
(45) Date of Patent: May 26, 2015

(54) DEPLOYABLE AIRBAG ARRANGEMENT FOR REAR SEAT OCCUPANT

(71) Applicant: Ford Global Technologies, LLC, Dearborn, MI (US)

(72) Inventors: Mohammed Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/276,471

(22) Filed: May 13, 2014

(51) Int. Cl.
*B60R 21/207* (2006.01)
*B60N 2/20* (2006.01)
*B60R 21/00* (2006.01)

(52) U.S. Cl.
CPC ............... *B60R 21/207* (2013.01); *B60N 2/20* (2013.01); *B60R 2021/0006* (2013.01); *B60R 2021/0044* (2013.01); *B60R 2021/0055* (2013.01); *B60R 2021/2078* (2013.01)

(58) Field of Classification Search
USPC .................................. 280/730.2, 728.2, 733
See application file for complete search history.

(56) References Cited

U.S. PATENT DOCUMENTS

| | | | | |
|---|---|---|---|---|
| 5,161,821 | A * | 11/1992 | Curtis ......................... | 280/730.2 |
| 6,029,993 | A * | 2/2000 | Mueller ...................... | 280/730.2 |
| 6,059,311 | A * | 5/2000 | Wipasuramonton et al. . | 280/729 |
| 7,021,654 | B2 * | 4/2006 | Honda et al. ............... | 280/730.2 |
| 7,198,288 | B2 | 4/2007 | Kim et al. | |
| 7,819,424 | B2 | 10/2010 | Toda et al. | |
| 7,926,838 | B2 | 4/2011 | Honda et al. | |
| 2011/0006507 | A1 * | 1/2011 | Fukawatase et al. ......... | 280/733 |
| 2012/0038135 | A1 | 2/2012 | Oomori et al. | |
| 2012/0187729 | A1 | 7/2012 | Fukawatase et al. | |
| 2014/0042733 | A1 * | 2/2014 | Fukawatase ............... | 280/730.2 |

FOREIGN PATENT DOCUMENTS

WO 2013008999 A1 1/2013

OTHER PUBLICATIONS

Side and Curtain Airbags, Tech Sheet, 1 Page.
Side-Impact Airbags are Usually Located in the Backrest of the Seat, and Inflate Between the Door and the Seat Occupant,, Autoliv, 1 Page.
Study on Improving Occupant Injury Performance for FMCSS214 Side Pole Impact, Young Woong Kim, Byung Ryul Ham, In Ho Choi, Han II Bae, Hyundai Motor Co. & Kia Motors Corp, Korea, Paper No. 09-0100.

* cited by examiner

*Primary Examiner* — Faye M Fleming
(74) *Attorney, Agent, or Firm* — LeClairRyan

(57) ABSTRACT

An airbag system for protecting rear seat occupants in dynamic side impacts using an improved packaging arrangement is provided. The system includes seat base and seat back frames. The seat back frame is movable between an upright position and a reclined position. The system further includes a unified airbag having a pelvic portion and a thoracic portion. The pelvic portion is positioned adjacent to the seat base frame. The thoracic portion is positioned adjacent to the seat back frame. The unified airbag is attached to the seat base frame by fixed anchors and to the seat back frame by a movable anchor. A grooved track is provided for attachment of the movable anchor. The airbag may be a strip shape or a triangular shape. One or more tethers may be attached to the unified airbag.

19 Claims, 5 Drawing Sheets

DEPLOYABLE AIRBAG ARRANGEMENT FOR REAR SEAT OCCUPANT

TECHNICAL FIELD

The disclosed inventive concept relates generally to airbags for vehicles. More particularly, the disclosed inventive concept relates to an airbag for a rear seat passenger that provides protection to both the occupant's pelvis and thorax in a single airbag in the event of a side impact.

BACKGROUND OF THE INVENTION

Airbag systems for the protection of front seat passengers of automotive vehicles in an impact event are commonly employed to reduce occupant injury. Known systems incorporate, for example, steering wheel, instrument panel, curtain, and seat belt airbags. These systems provide protection to front seat passengers in a variety of impact situations, including front and side impact as well as in a vehicle rollover. Regardless of their placement in the vehicle, in all situations the airbag is directed to providing a cushioning layer between the interior of the vehicle and the front seat occupant when the curtain inflates during the impact event.

In the past, the front seat of the vehicle was the focus of placement of the airbags. While providing good protection for the driver and for the front seat passenger, current arrangements provide less protection to rear seat passengers. This is particularly true in dynamic side impacts where rear seat occupants are not protected to a desired level.

Automotive vehicle designers have made efforts to improve the measure of safety for rear seat passengers through the use of airbags. For example, some newer vehicles have been fitted with curtain airbags that extend from the A-pillar to the C-pillar and, sometimes, beyond the C-pillar. These airbags, when present, have provided for extra protection.

Perhaps the greatest challenge to automotive vehicle designers when trying to provide additional airbag protection to rear seat occupants is the issue of packaging. The areas to the sides of the seats limit placement of airbags, thus rendering packaging a significant challenge.

As in so many areas of vehicle technology there is always room for improvement related to the use and operation of airbag systems for automotive vehicles.

SUMMARY OF THE INVENTION

The disclosed inventive concept provides an improvement to known airbag systems for rear seat occupants automotive vehicles that overcomes the packaging challenges faced by designers today. Particularly, the disclosed inventive concept provides a seat mounted airbag protection system for protecting rear seat occupants in dynamic side impacts while providing an easier packaging arrangement for side airbags for rear seat occupant protection.

The disclosed inventive concept includes rear seat assembly having a seat base frame and a seat back frame. The seat back frame is movable between an upright position and a reclined position relative to the seat base frame.

The rear seat assembly includes a unified airbag having a pelvic portion and a thoracic portion that, when deployed, provides a layer of protection between the rear seat occupant and the interior side of the vehicle in an impact event. The pelvic portion of the unified airbag is positioned adjacent to the seat base frame. The thoracic portion of the unified airbag is positioned adjacent to the seat back frame.

The unified airbag is attached to the seat base frame by fixed anchors and to the seat back frame by a movable anchor. A grooved track is formed on the side of the seat back frame to which the movable anchor is movably attached.

Two fixed anchors attach unified airbag to the seat base frame. One anchor is fixed to the front portion of the seat base frame and the other anchor is fixed to the rear portion of the seat base frame.

The unified airbag may have a variety of shapes. One shape is that of a strip and the other is triangular.

One or more tethers may be attached to the unified airbag to limit expansion of the bag upon deployment and to define its shape.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
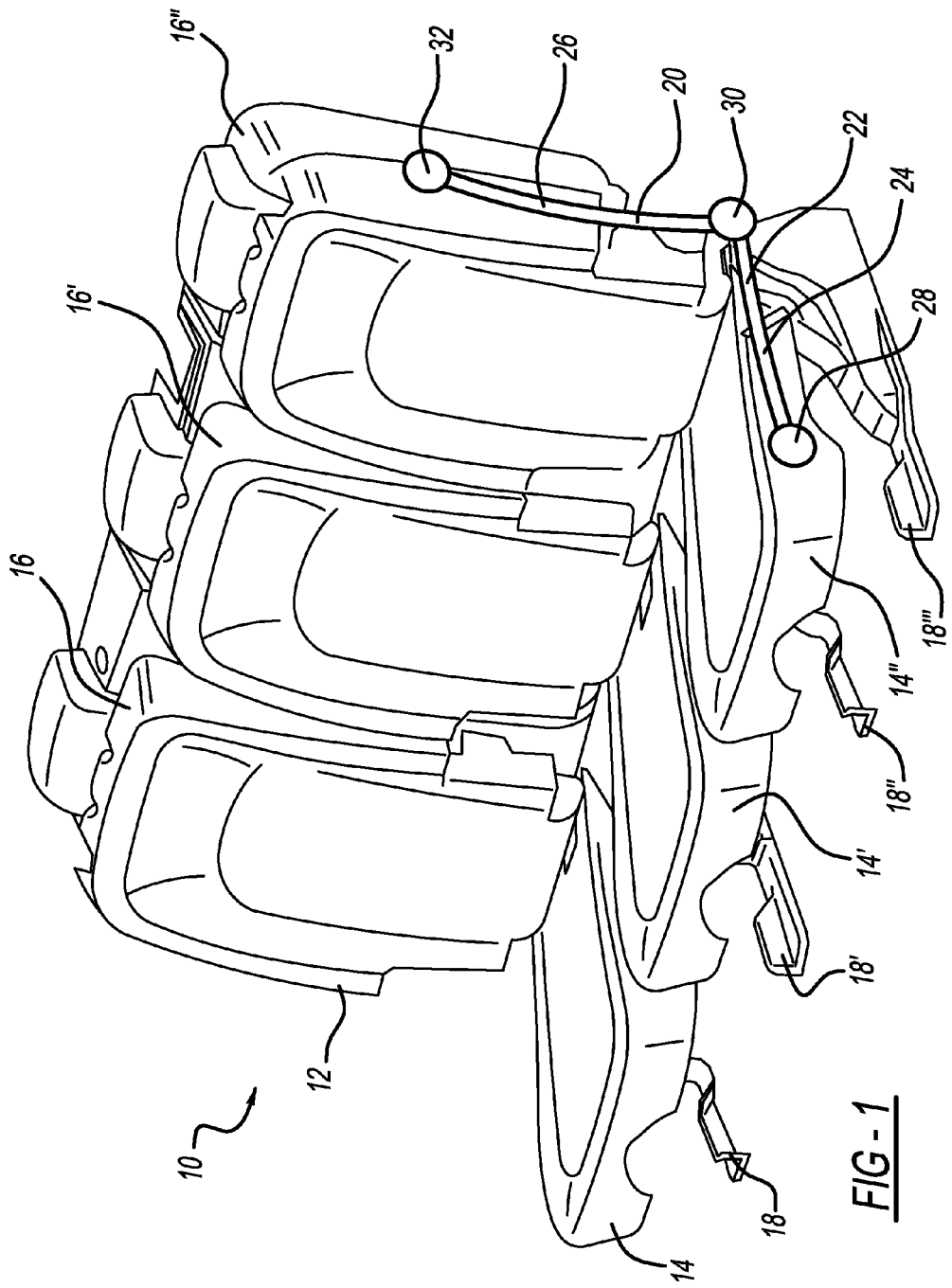
FIG. 1 illustrates a perspective view of a seat-mounted airbag system for rear seat occupants according to the disclosed inventive concept.

In the following figures, the same reference numerals will be used to refer to the same components. In the following description, various operating parameters and components are described for different constructed embodiments. These specific parameters and components are included as examples and are not meant to be limiting.

In general, the disclosed invention provides a system and method for protecting a rear seat occupant in the event of a side impact. The system includes a single airbag that provides simultaneous protection for the occupant's pelvis and thorax.

A perspective view of a rear seat assembly for a vehicle incorporating the seat-mounted airbag system of the disclosed inventive concept is shown in perspective view in FIG. 1. The rear seat airbag assembly, generally illustrated as 10, includes a rear seat assembly 12. It is to be understood that the rear seat assembly 12 illustrated in the figures is only suggestive and that other seat configurations may be possible, including, for example, a bench seat. In addition, the disclosed inventive concept may also find application in other seating positions in the vehicle, including, without limitation, a third row seat.

Regardless of position, the rear seat assembly 12 includes seat base frames 14, 14' and 14" and seat back frames 16, 16' and 16". The seat back frames 16, 16' and 16" are pivotably attached to their respective seat base frames 14, 14' and 14". The seat bases 14, 14' and 14" are attached to the vehicle floor (not shown) by seat base brackets 18, 18', 18" and 18'".

The rear seat airbag assembly 10 further includes a rear seat airbag routing and anchoring system 20. The rear seat airbag routing and anchoring system 20 includes a unified rear seat airbag 22 having a pelvic bag portion 24 and a thoracic bag portion 26.

The unified rear seat airbag 22 is anchored to the rear seat assembly 12 preferably at three points, though the position and number may be varied from those anchoring points illustrated. Preferably, the unified rear seat airbag 22 is anchored to the forward portion of the seat base frame 14" at a first seat base fixed anchor 28 and to the rearward portion of the seat base frame 14" at a second seat base fixed anchor 30.

Figure 2:
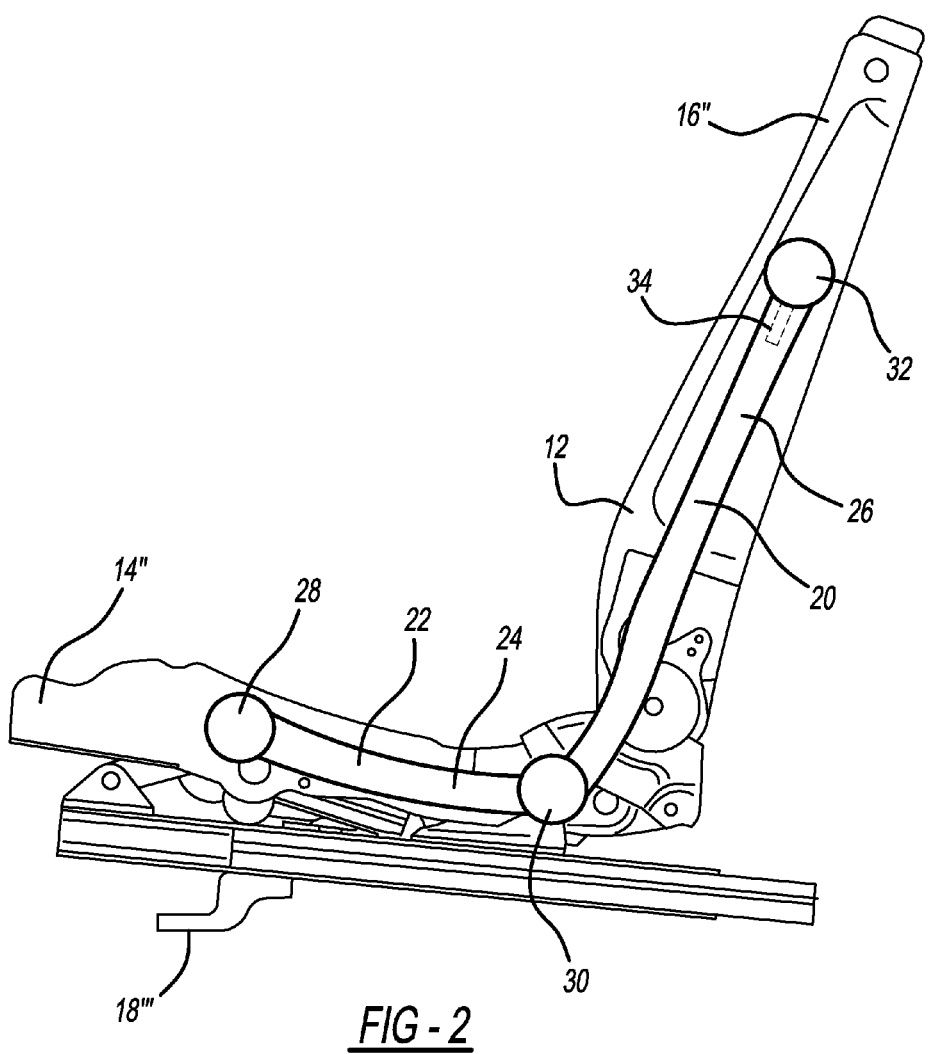
FIG. 2 illustrates a side view the rear seat shown in FIG. 1 with the seat shown in its upright position.
Figure 3:
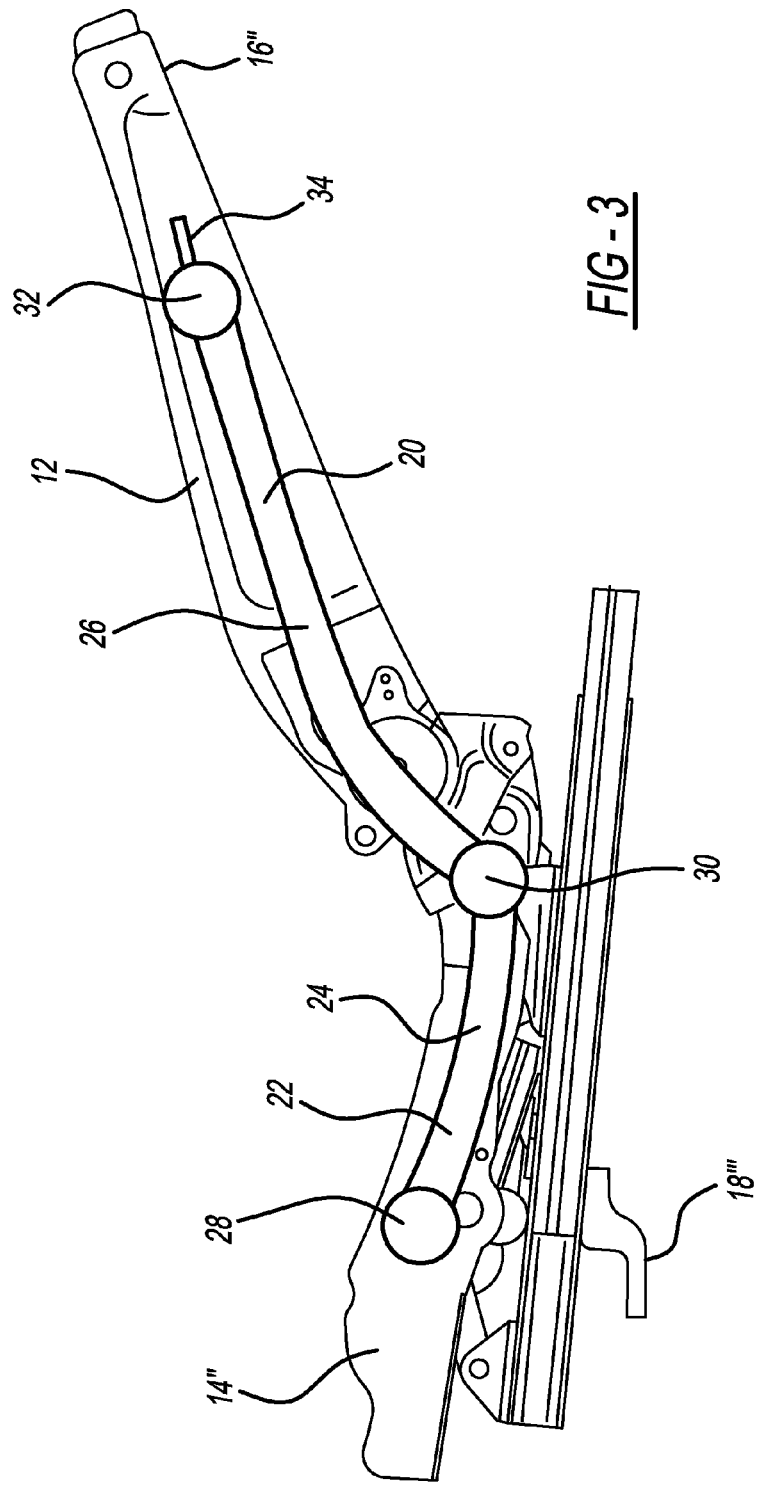
FIG. 3 is the same view of the rear seat according to the disclosed inventive concept as shown in FIG. 2 but showing the seat in its reclined position.

The seat back frames 16, 16' and 16" are movable between an upright position relative to the seat base frames 14, 14' and 14" as illustrated in FIG. 2 and a reclined position illustrated in FIG. 3. The reclined position of the seat back frames 16, 16' and 16" shown in FIG. 3 represents an ideal degree of maximum rotation.

The disclosed inventive concept provides an arrangement that allows the seat back frames 16, 16' and 16" to move to their reclined positions that includes a movable anchor that attaches the unified rear seat airbag 22 to the rear seat assembly 12. Particularly, the unified rear seat airbag 22 is attached to the seat back frame such as to the rear seat back frame 16" at a movable or sliding anchor 32. The movable or sliding anchor 32 is attached to the seat back frame 16" at a slit or grooved track 34 shown in broken lines in FIG. 2 and in solid lines in FIG. 3. The movable or sliding anchor 32 is attached to a movable base (not shown) mechanically associated with the slit or grooved track 34.

In FIG. 2, the seat back frame 16" is in its raised or upright position and, in this position, the movable or sliding anchor 32 is shown in its highest position relative to the slit or grooved track 34. Thus positioned, the pre-deployed unified rear seat airbag 22 is kept properly anchored.

In FIG. 3, the seat back frame 16" is in its lowered or reclined position and, in this position, the movable or sliding anchor 32 is shown in its lowest position relative to the slit or grooved track 34. Thus positioned, the pre-deployed unified rear seat airbag 22 is again kept properly anchored without being put under strain despite the lowering of the seat back frame 16" relative to the seat base frame 14".

FIGS. 1 through 3 illustrate the rear seat assembly 12 without seat padding or seat covering. Accordingly, the rear seat airbag routing and anchoring system 20 and its associated unified rear seat airbag 22 are visible. However, as fitted in the vehicle, the rear seat assembly 12 would be covered.

Figure 4:
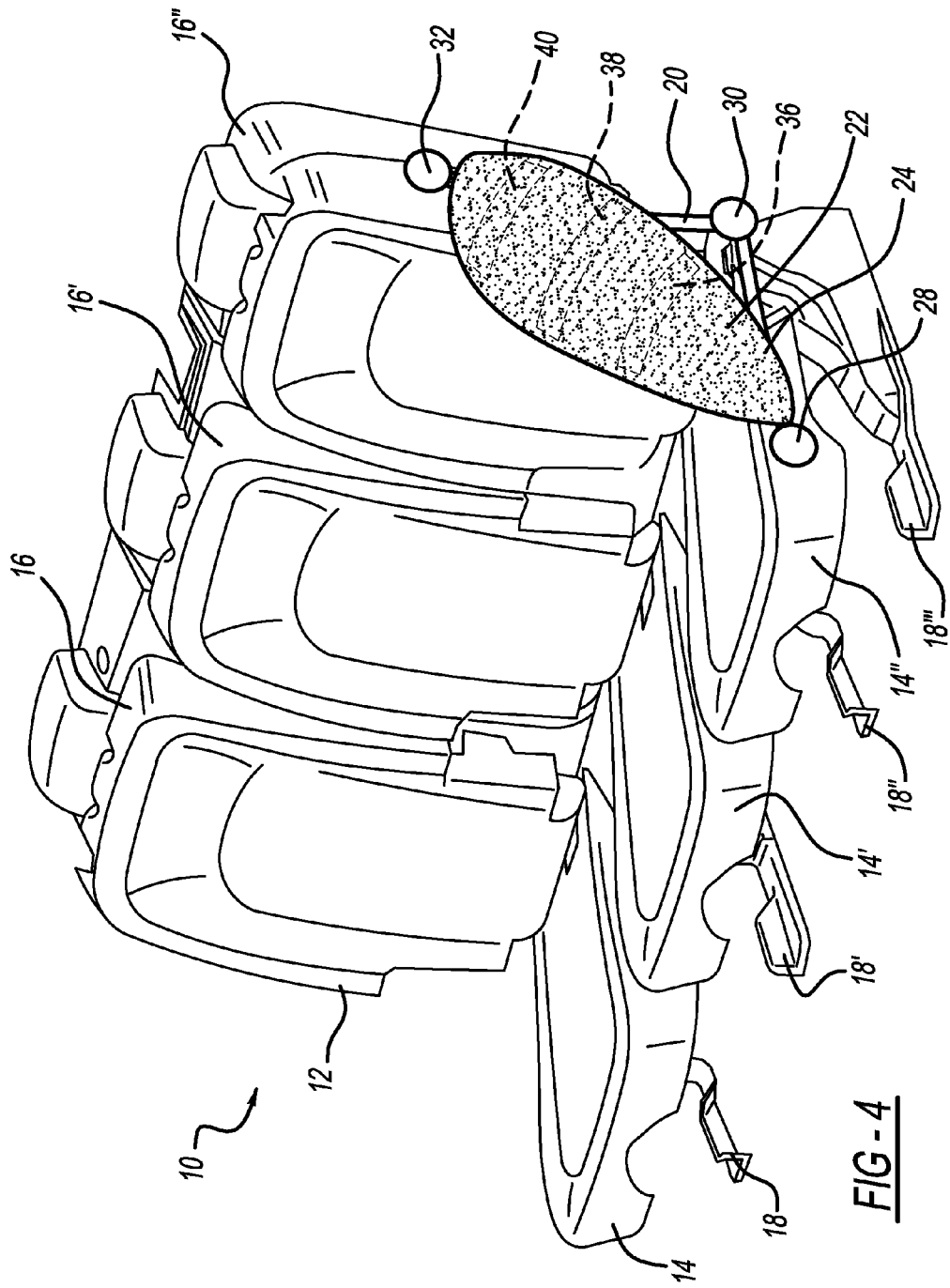
FIG. 4 illustrates the same view of the seat-mounted airbag system of the disclosed inventive concept shown in FIG. 1 but showing one embodiment of the seat-mounted airbag in its deployed state.

In a side impact event, a side impact sensor (not shown) senses the impact and causes an inflator, such as a cold gas inflator (not shown) to simultaneously inflate both the pelvic bag portion 24 and the thoracic bag portion 26 of the unified rear seat airbag 22 as shown in FIG. 4. Alternatively, a self-triggering cold gas system (not shown) can also be used to deploy the unified rear seat airbag 22. The unified rear seat airbag 22 deploys through its housing (not shown) and through the seat cover (not shown) to its deployed position.

The unified rear seat airbag 22 of FIG. 4 has a strip shape. One or more tethers are preferably provided in association with the unified rear seat airbag 22 to limit the deploying unified rear seat airbag 22 to defined strip shape. Particularly, and referring to FIG. 4, a first tether 36, a second tether 38, and a third tether 40 are provided in association with the unified rear seat airbag 22. The first tether 36, the second tether 38 and the third tether 40 may be fitted either internally with respect to the unified rear seat airbag 22 or may be externally attached.

The strip shape of the unified rear seat airbag 22 shown in FIG. 4 is suggestive and is not intended as being limiting. Alternative shapes may be adopted without compromising the effectiveness of the disclosed inventive concept in protecting the rear seat passenger in an impact event. One non-limiting alternative to the airbag shape is shown in FIG. 5.

Figure 5:
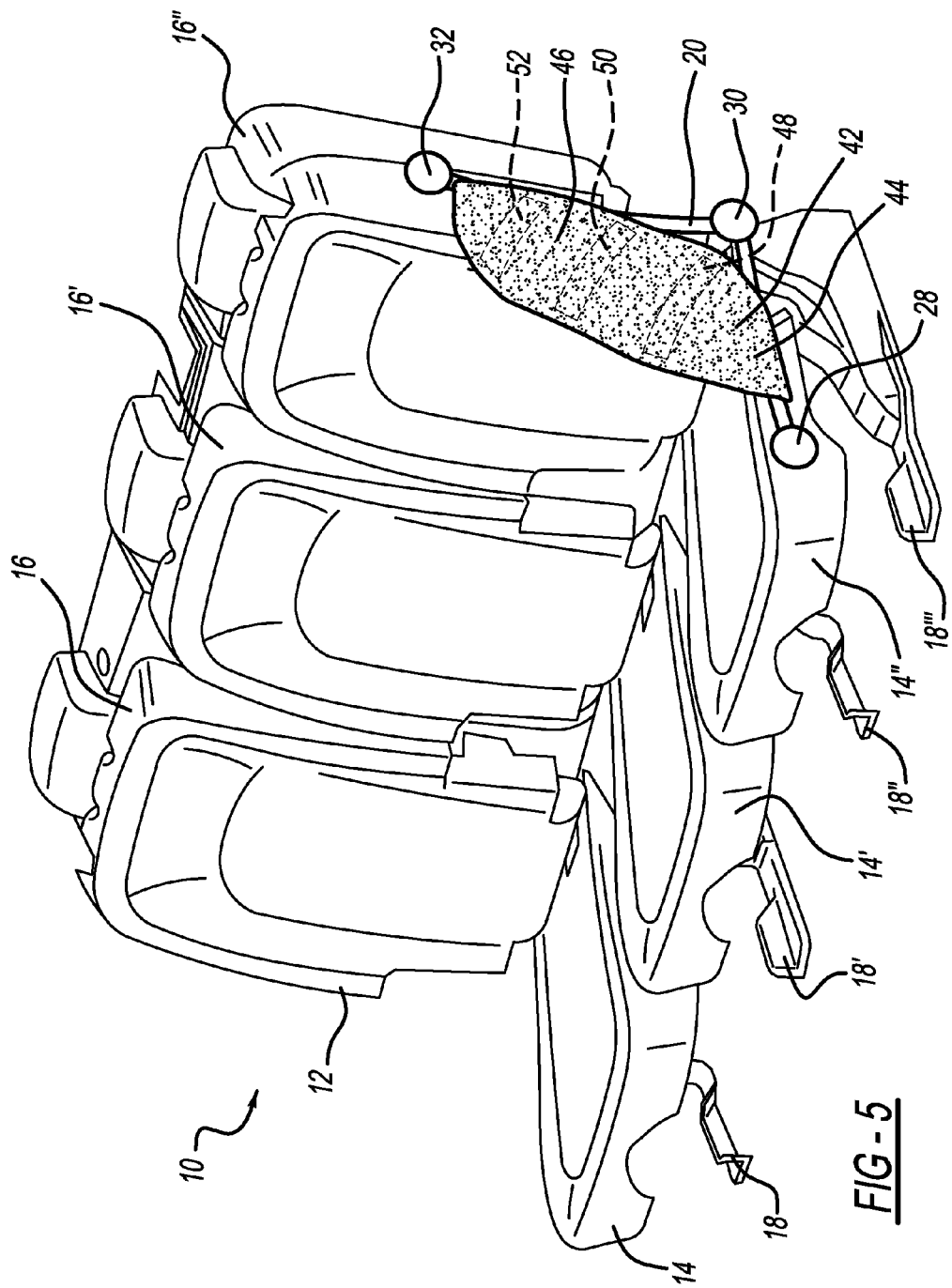
FIG. 5 illustrates the same view of the seat-mounted airbag system of the disclosed inventive concept shown in FIG. 1 but showing another embodiment of the seat-mounted airbag in its deployed state.

With reference to FIG. 5, a unified rear seat airbag 42 having a generally triangular shape is shown. The unified rear seat airbag 42 includes a pelvic bag portion 44 and a thoracic bag portion 46.

Like the unified rear seat airbag 22 of FIG. 4, the unified rear seat airbag 42 may have one or more tethers to limit the deploying unified rear seat airbag 42 to a defined triangular shape. The unified rear seat airbag 42 may include, for example, a first tether 48, a second tether 50, and a third tether 52. The first tether 48, the second tether 50 and the third tether 52 may be fitted either internally with respect to the unified rear seat airbag 42 or may be externally attached.

In operation, in the event of a side impact, the unified rear seat airbag deploys from its housing to provide protection to both the pelvic region and the thoracic region of the rear seat occupant. Protection to these areas is delivered simultaneously by deployment of the single airbag. The disclosed inventive concept thus overcomes the packaging challenges confronted by the prior art while delivering effective protection to the rear seat occupant during an impact event.

Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. An airbag system for a vehicle comprising:
   a seat having a seat base frame and a seat back frame, said seat back being movable between an upright position and a reclined position;
   an inflatable unified airbag having a pelvic portion and a thoracic portion;
   a fixed anchor for attaching said airbag to said seat base; and
   a movable anchor for movably attaching said airbag to said seat back.

2. The airbag system for a vehicle of claim 1 further including a grooved track formed in said seat back frame to which said movable anchor is movably attached.

3. The airbag system for a vehicle of claim 1 wherein said fixed anchor is a first anchor and wherein the airbag system further includes a second fixed anchor.

4. The airbag system for a vehicle of claim 3 wherein said seat base frame includes a front portion and a rear portion, and wherein said first anchor is fitted to said front portion of said seat base frame and said second anchor is fitted to said rear portion of said seat base frame.

5. The airbag system for a vehicle of claim 1 wherein said pelvic portion of said inflatable unified airbag is positioned adjacent said seat base frame.

6. The airbag system for a vehicle of claim 1 wherein said thoracic portion of said inflatable unified airbag is positioned adjacent said seat back frame.

7. The airbag system for a vehicle of claim 1 wherein said inflatable unified airbag has a shape, said shape being a strip.

8. The airbag system for a vehicle of claim 1 wherein said inflatable unified airbag has a shape, said shape being triangular.

9. The airbag system for a vehicle of claim 1 further including at least one tether attached to said inflatable unified airbag.

10. An airbag system for a vehicle having a seat base and a seat back movable with respect to the base, the system comprising:
   an inflatable unified airbag having a pelvic portion fitted adjacent the seat base and a thoracic portion fitted adjacent the seat back;
   a fixed anchor for attaching said airbag to the seat base; and
   a movable anchor for movably attaching said airbag to the seat back.

11. The airbag system for a vehicle of claim 10 further including a grooved track formed in the seat back to which said movable anchor is movably attached.

12. The airbag system for a vehicle of claim 10 wherein said fixed anchor is a first anchor and wherein the airbag system further includes a second fixed anchor.

13. The airbag system for a vehicle of claim 12 wherein the seat base includes a front portion and a rear portion, and wherein said first anchor is fitted to said front portion of the seat base and said second anchor is fitted to said rear portion of the seat base.

14. The airbag system for a vehicle of claim 10 wherein said inflatable unified airbag has a shape, said shape being a strip.

15. The airbag system for a vehicle of claim 10 wherein said inflatable unified airbag has a shape, said shape being triangular.

16. The airbag system for a vehicle of claim 10 further including at least one tether attached to said inflatable unified airbag.

17. An airbag system for a vehicle comprising:
   a seat having a seat base frame and a seat back frame, said seat back being movable between an upright position and a reclined position;
   an inflatable unified airbag having a pelvic portion and a thoracic portion, said pelvic portion being fitted adjacent said seat base frame and said thoracic portion being fitted adjacent said seat back frame; and
   anchors for attaching said airbag to said seat, said seat base frame including a front portion and a back portion and wherein said anchors include at least two fixed anchors and one movable anchor, one of said at least two fixed anchors being attached to said front portion of said seat base frame, the other of said at least two fixed anchors being attached to said rear portion of said seat base frame, and said movable anchor being movably attached to said seat back frame.

18. The airbag system for a vehicle of claim 17 further including a track formed in said seat back frame to which said movable anchor is movably attached, said movable anchor being movable between a first position relative to said track when said seat back frame is in its upright position and to a second position relative to said track when said seat back frame is in its reclined position.

19. The airbag system for a vehicle of claim 17 wherein said inflatable unified airbag has a shape, said shape being selected from the group consisting of a strip and a strip and a triangle.

\* \* \* \* \*